UNITED STATES PATENT OFFICE.

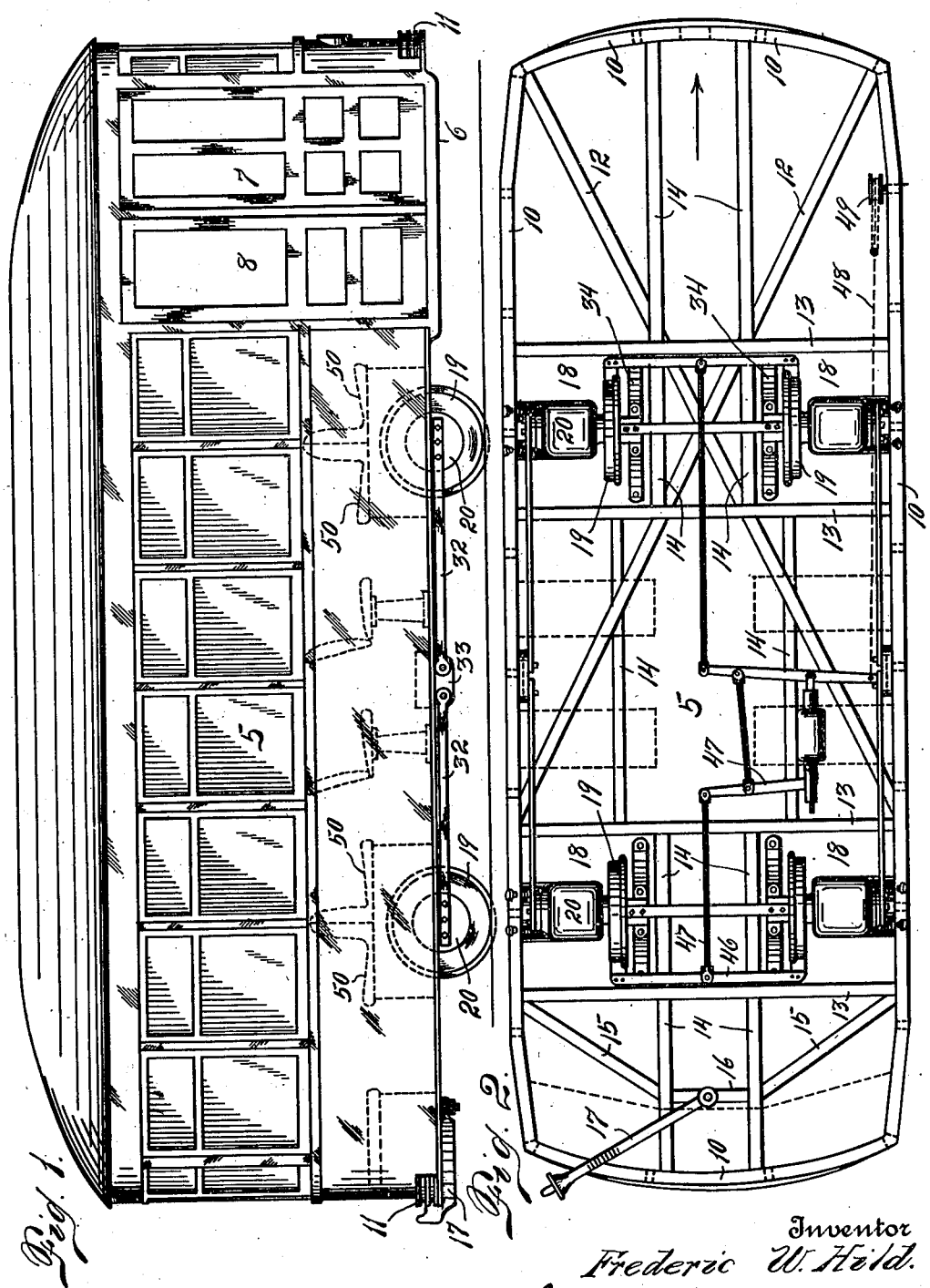

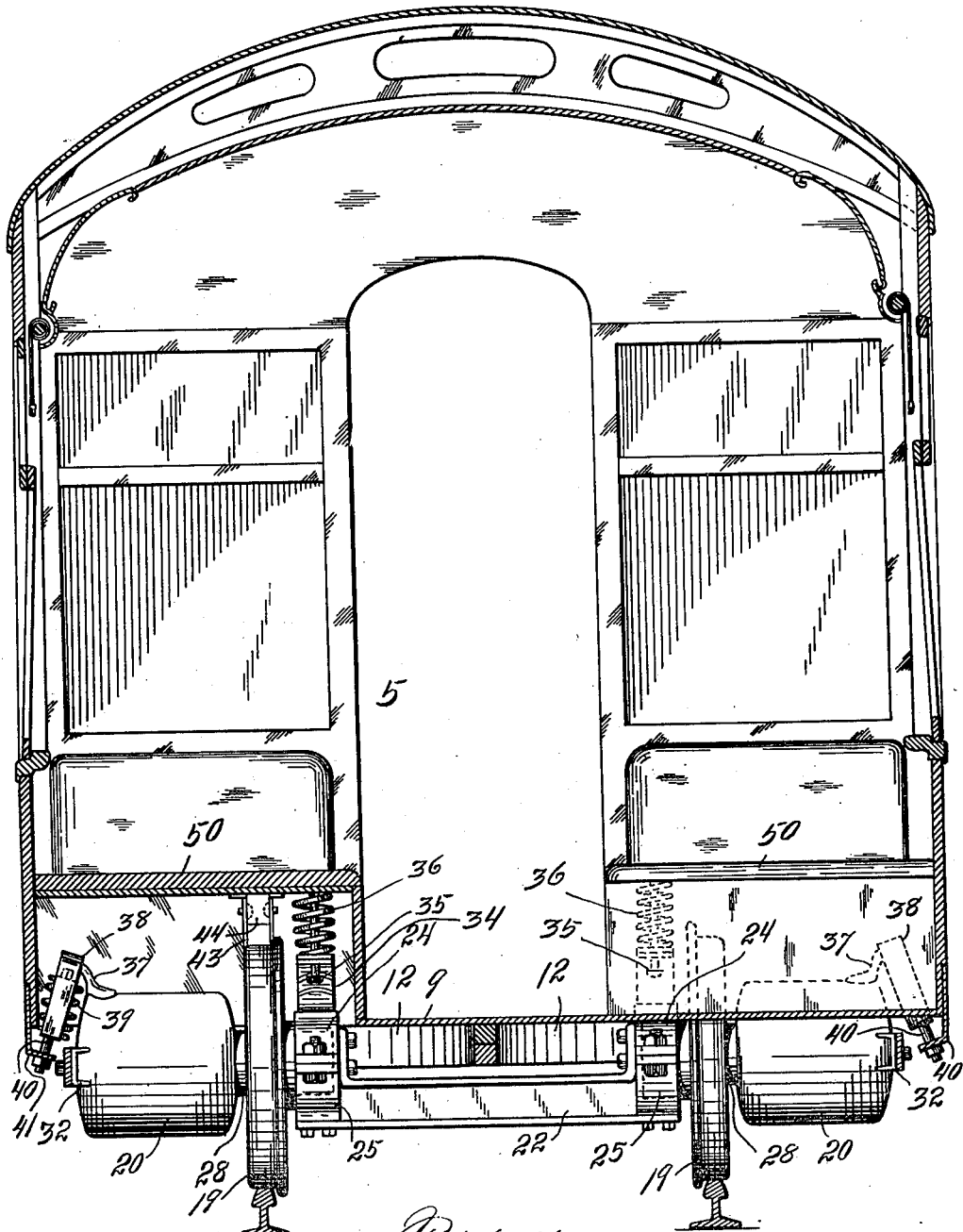

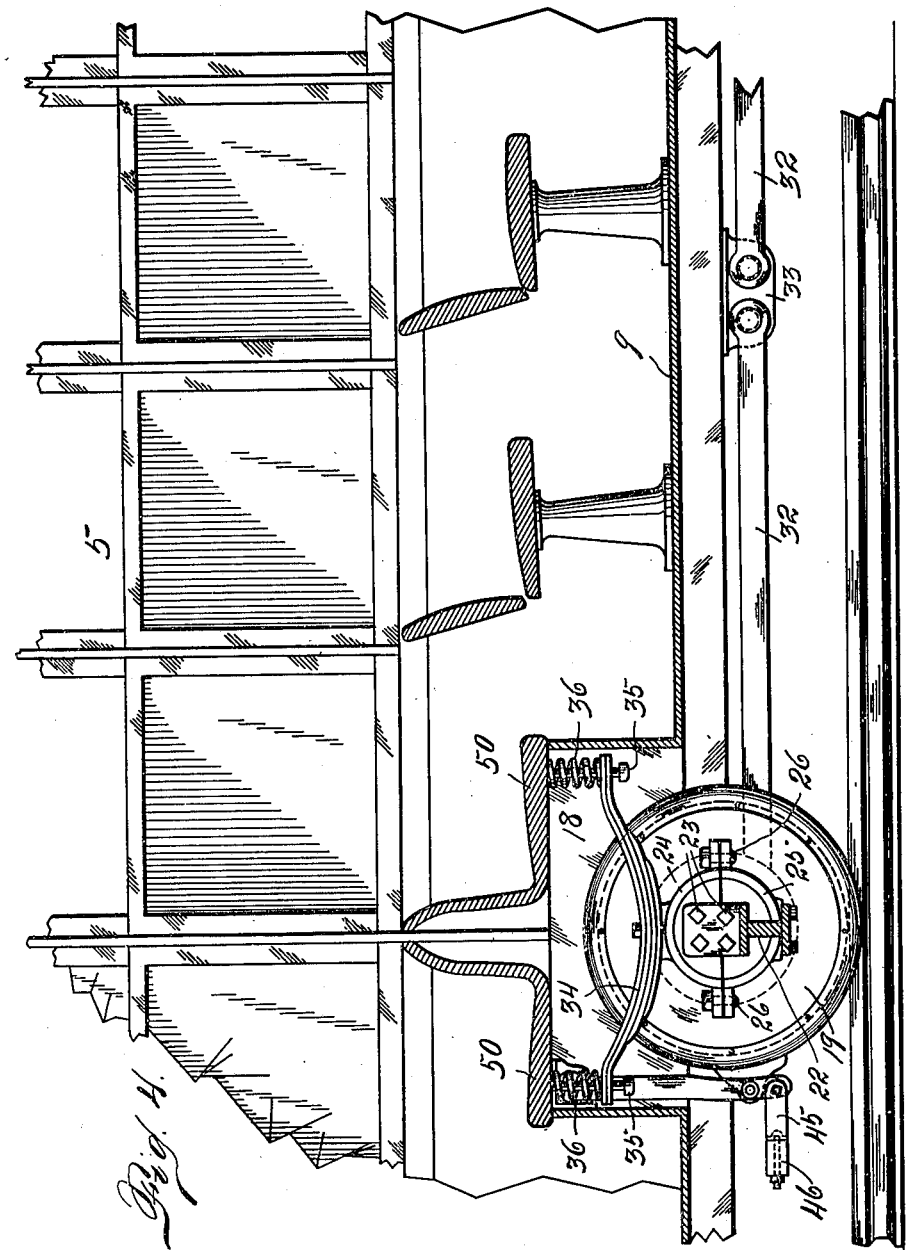

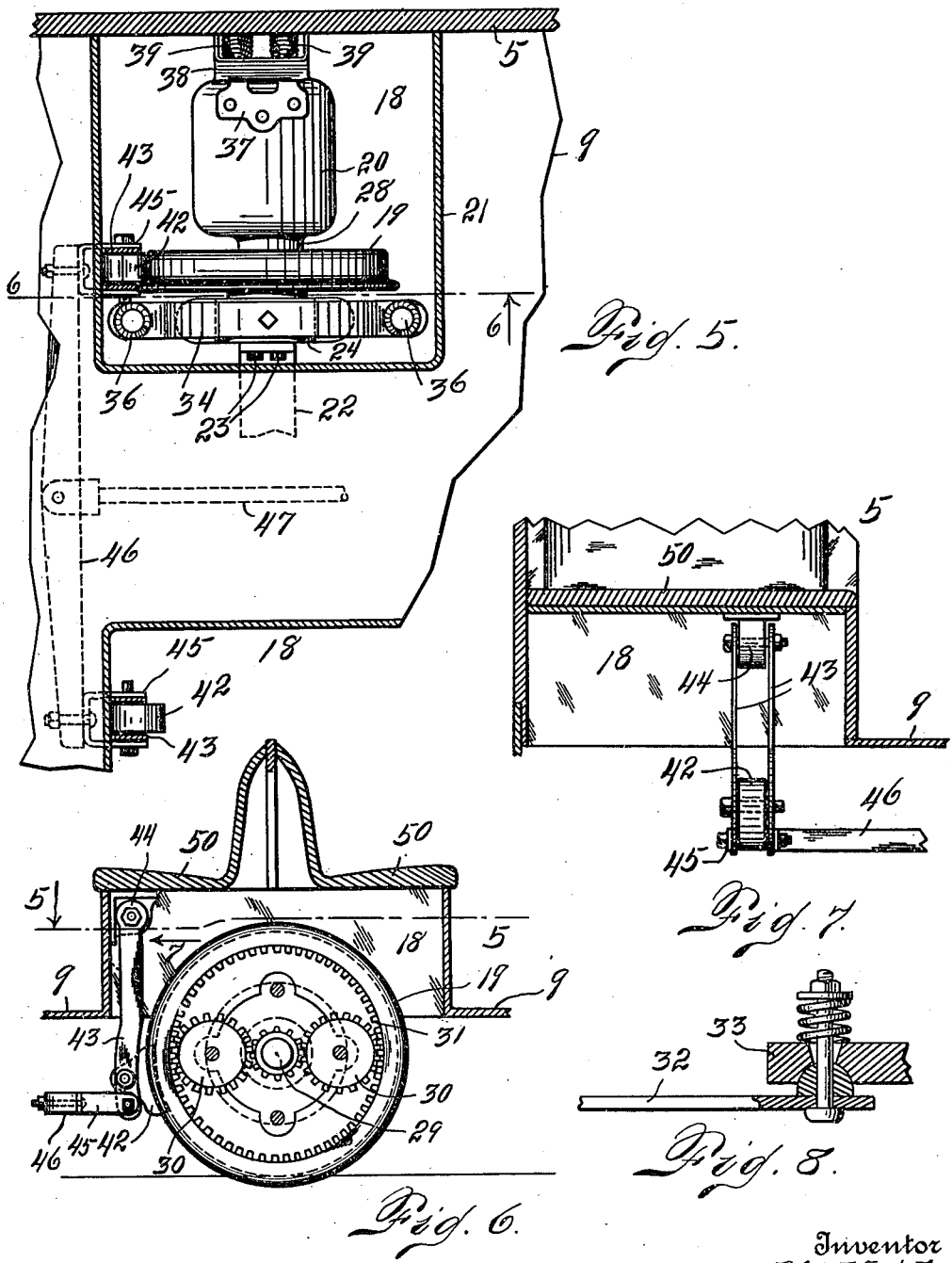

FREDERIC W. HILD, OF DENVER, COLORADO.

MOTOR-VEHICLE.

1,292,774. Specification of Letters Patent. Patented Jan. 28, 1919.

Application filed October 2, 1916. Serial No. 123,296.

*To all whom it may concern:*

Be it known that I, FREDERIC W. HILD, citizen of the United States, residing at the city and county of Denver and State of Colorado, have invented certain new and useful Improvements in Motor-Vehicles; and I do declare the following to be a full, clear, and exact description of the invention such as will enable others skilled in the art to which it appertains to make and use the same, reference being had to the accompanying drawings, and to the characters of reference marked thereon, which form a part of this specification.

The present invention relates to improvements in passenger carrying vehicles and pertains more particularly to that class commonly referred to as step-less.

In the construction of stepless conveyances heretofore an entrance platform has been provided either at the center or end of the vehicle, the said platform being but a comparatively short distance above the level of the street. In order to make this construction possible the platform itself has been built considerably below the surface of the main flooring of the car and consequently passengers on entering the conveyance would have to go up one or two steps, or else walk up an inclined passage to enter the car proper and reach the seats. So far as the inventor is aware the flooring of the vehicle has always heretofore been located above the running gear and in most instances above the tops of the wheels. In order to overcome these difficulties and permit of a construction in which the level of the main flooring of the conveyance is but slightly raised above the sidewalks the present invention has been devised.

It consists briefly of forming separate built-up boxes or pockets extending upwardly into the body of the vehicle considerably above the level of the floor. A pair of oppositely disposed seats are provided on top of these pockets hence no available space is lost. In order to construct a vehicle in this manner special provision must be made for the running gear including wheel and motor mountings. It is also necessary to provide a special arrangement of the sills, braces and other frame supporting pieces.

Novel means for transmitting the tractive effort of the motors and wheels to the car body are provided which completely relieve the springs of any such duty. The usual king pin connections between the individual wheel trucks and the car body are dispensed with and instead flexibly connected rods extend from a bracket centrally located on the car body to the motor casings.

With these and other objects in view which will become apparent as the description is proceeded with, the invention consists in the combination and arrangement of parts more fully set forth in the following specification, illustrated in the accompanying drawings and more particularly pointed out in the appended claims.

In the drawings:—

Figure 1 is a side elevation of the present invention illustrated as embodied in a street car.

Fig. 2 is a bottom plan view of the same.

Fig. 3 is a vertical transverse sectional view drawn to a larger scale.

Fig. 4 is a fragmental view partly in section, partly in elevation of the invention.

Fig. 5 is a fragmental detail taken on the line 5—5, Fig. 6, looking in the direction of the arrow.

Fig. 6 is a detail showing one of the wheels with its associated brake mechanism in side elevation, parts of the car structure appearing in section, the section is taken on the line 6—6, Fig. 5, looking in the direction of the arrow, and Fig. 7 is a detail of the brake shoe and its mounting illustrated in Fig. 6 and looking in the direction of the arrow 7.

Fig. 8 is a detail.

While the invention is hereinafter illustrated and described as embodied in the construction of a street car, it is to be understood that the principal features thereof are equally applicable to any kind of motor-propelled vehicle or conveyance adapted for passenger service.

Referring now to the drawing, the invention is illustrated as embodied in the construction of an electric street car 5, having a front platform 6 equipped with entrance and exit doos 7 and 8 respectively. The lower supporting frame-work of the car upon which the flooring 9 is laid comprises a plurality of sills 10 connected to form a frame structure of general rectangular shape, the ends being slightly tapered and having curved buffer or fender plates 11. A pair of crossed braces 12 have their forward ends fastened at the opposite corners of the forward platform, and their rear extremities secured to the side sills 10 just in front of the rear trucks. These braces 12 cross each other on approximately the longitudinal center of the car, their point of intersection being midway between the front car wheels. Two pairs of parallel struts 13 are provided suitably spaced on either side of the front and rear wheel trucks. Longitudinally disposed parallel braces 14 are arranged in pairs, one at the forward end of the car between the front strut 13 and the end sill 10; one between the forward pair of struts 13; another between wheel trucks; and in like manner others between the rear pair of struts 13, and between the rearmost strut 13 and the rear car sill 10. At the rear end of the car diagonal braces 15 extend from the side sills 10 and are connected by a central transversely disposed member 16 to which the car coupling 17 is pivotally connected. The manner of supporting and bracing the frame-work of the car is such as to permit of building up four recesses or pockets 18 upwardly above the floor level without weakening the supporting structure. Each pocket 18 is adapted to contain a wheel 19 together with its associated motor 20 and brake mechanism. A suitable casing 21 is provided within each pocket 18. The front and rear wheels are similarly mounted and operated, hence a detailed description of one pair will suffice for both. A transverse stationary axle 22 of I-beam cross section extends under the frame-work. At its opposite ends the upper flange of this axle is bent back and upwardly being bolted or riveted as shown at 23 with a two-part cylindrical casing, the upper and lower parts 24 and 25 of which are bolted together by bolts 26. The motor 20 at the outside or the wheel has a casing hub 28 which is integral with a part of the wheel frame and extends therethrough being inclosed and supported within the two-part casing just referred to. The wheel 19 is driven by the motor armature having a pinion 29 fixed thereto which meshes with a pair of gears 30 which in turn drive an annular rack 31 formed on the wheel 19. A rod or bar 32 connects the outer motor casing with a central bracket or plate 33 secured to the under-side of the frame.

A spring pressed ball and socket joint as shown in Fig. 8 is provided to procure the desired flexibility between bar 32 and plate 33.

With this particular arrangement and location of the wheels it is necessary to materially modify the customary spring supports and braking mechanism. The main supporting springs for the body of the car comprise a large spring 34 composed of a plurality of superimposed leaves fastened together at their central portions and coupled to the upper side of the two-part casing. Depending adjustable bolts 35 secured to the under side of the car frame extend downwardly and pass through perforations formed in the outer extremities of the master leaves of the spring 34. Heavy coiled springs 34 surround these bolts bearing at their upper ends against the car frame and resting with their lower ends on the spring 34. A bracket 37 secured to the upper part of the motor casing forms a support for a housing 38 in which heavy coiled springs 39 are carried. An adjustable bolt 40 passes loosely through the spring and housing carrying a washer at its upper end bearing downwardly to compress the spring while its lower end is secured in a bracket 41 depending from the side frame of the car. It will thus be seen that flexible spring supports are provided for the car body adapted to absorb vibrations either longitudinally or transversely of the vehicle. The particular combination of leaf and coiled springs further tends to keep the car in a state of equilibrium by compensating for any rocking or side to side movement.

In order to employ the usual braking mechanism a special arrangement is necessary. The brake shoes 42 are in each instance carried on the lower end of a vertically suspended arm 43 pivotally secured at its upper end to a bracket 44 made fast to the casing at the top of the recess or pocket 18. A horizontal U-clip 45 is pivotally connected with the lowermost extremity of the arm 43 below the point at which it is secured to the brake shoe 42. These rods 45 at their opposite ends are fastened to a cross rod 46 which is connected in the usual manner by links 47 to the air operating device and by the chain 48 to the hand brake 49 on the front platform.

In order to conceal and utilize the boxes or casings which project above the car floor a pair of oppositely disposed seats 50 are arranged over each of the four. Thus practically all the available space within the car is made use of.

It will be seen that by the present invention a strictly stepless car is provided having its entire floor and platform on a common level within a few inches of the pavement. The necessity for inside steps, or inclined passageways is completely done away with and the protruding structures within the vehicle body are employed as seats hence there is no loss of space and no crude or unsightly parts to obstruct the passengers.

By having the rods 32 extend from the motor casings to the central brackets 33 and there fixedly connected to the car body the tractive effort of the motors and wheels is transmitted to the body completely relieving the springs of any such duty while at the same time sufficient freedom of movement is permitted the wheels in rounding a curve without cramping. The rods 32 furthermore serve to maintain the motor casing stationary with respect to the torque of the rotor of the motor. The distance between the wheels and the motors on the same side of the car is properly maintained. By extending the rods 32 to the center of the car body a longer leverage is obtained and consequently these members, being but slightly stressed, may be of comparatively light construction.

Having described my invention what I claim is:

1. A vehicle of the class described comprising a body frame, housed in chambers extending upwardly above the floor level, a wheel and associated motor in each chamber and flexible connections between each motor and the central portion of the body frame.

2. A vehicle of the class described comprising a body frame having recesses formed therein, a wheel and driving motor mounted in each recess and rods flexibly connecting the several motors with the body frame at its central portion.

3. A vehicle of the class described comprising a body frame having upwardly extending chambers formed therein, a wheel and associated motor in each of said chambers and rods connected at one extremity with the motor, the opposite extremity of each rod being flexibly connected with the body frame at its central portion.

4. A vehicle of the class described comprising a body frame having housed chambers formed therein, a wheel and driving motor mounted in each chamber, and flexibly connected means for transmitting the tractive energy of the motors and wheels to the central part of the body frame.

In testimony whereof I affix my signature in presence of two witnesses.

FREDERIC W. HILD.

Witnesses:
H. A. VILLEMAGNE,
C. E. PARSONS.